United States Patent
Froroth et al.

(10) Patent No.: US 7,782,760 B2
(45) Date of Patent: Aug. 24, 2010

(54) CARRIER CLASS RESILIENCE SOLUTION FOR SWITCHED ETHERNET LOCAL AREA NETWORKS (LANS)

(75) Inventors: Ingvar Froroth, Hagersten (SE); Jesper Carlsson, Arsta (SE); Ulf Henrik Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 330 days.

(21) Appl. No.: 11/576,333

(22) PCT Filed: Sep. 30, 2004

(86) PCT No.: PCT/IB2004/003192

§ 371 (c)(1),
(2), (4) Date: Jan. 30, 2008

(87) PCT Pub. No.: WO2006/035262

PCT Pub. Date: Apr. 6, 2006

(65) Prior Publication Data

US 2008/0304477 A1 Dec. 11, 2008

(51) Int. Cl.
G06F 11/00 (2006.01)

(52) U.S. Cl. .................... 370/216; 370/242; 710/15; 714/1

(58) Field of Classification Search .............. None
See application file for complete search history.

(56) References Cited

U.S. PATENT DOCUMENTS

| | | | |
|---|---|---|---|
| 5,909,427 A | 6/1999 | Manning et al. | |
| 6,614,756 B1 * | 9/2003 | Morgenstern et al. | 370/230 |
| 6,910,149 B2 | 6/2005 | Perloff | |
| 7,085,237 B1 * | 8/2006 | Teodorescu | 370/242 |
| 7,099,271 B2 * | 8/2006 | Friesen et al. | 370/218 |
| 7,173,934 B2 | 2/2007 | Lapuh | |
| 7,406,038 B1 * | 7/2008 | Oelke et al. | 370/225 |
| 2001/0043561 A1 * | 11/2001 | Burns et al. | 370/216 |
| 2004/0085893 A1 * | 5/2004 | Wang et al. | 370/216 |
| 2004/0085894 A1 * | 5/2004 | Wang et al. | 370/216 |
| 2006/0069946 A1 * | 3/2006 | Krajewski et al. | 714/6 |
| 2009/0154342 A1 * | 6/2009 | Oltman et al. | 370/220 |

FOREIGN PATENT DOCUMENTS

WO WO 02/33912 A 4/2002

OTHER PUBLICATIONS

Shah, S. "Ethernet Automatic Protections Switching" (EAPS) IETF RFC 3619, Oct. 2003, Version 1.

* cited by examiner

Primary Examiner—Hong Cho
Assistant Examiner—Robert C Scheibel

(57) ABSTRACT

A Carrier Class Ethernet switch is described herein that has a resilient switch control system (RSCS) which manages redundant switch matrixes that use redundant links to connect to one or more application blades (e.g., switches, end stations). The Ethernet switch has Carrier Class characteristics because a Rapid Link Supervision Protocol (RLSP) is used to detect a fault in anyone of the redundant links between the redundant switch matrixes and the application blades. And, a RLSP distribution policy is used to coordinate and control isolation measures between the redundant switch matrixes and the application blades. Also described herein is a method for providing resilient Ethernet connectivity in a network.

7 Claims, 1 Drawing Sheet

CARRIER CLASS RESILIENCE SOLUTION FOR SWITCHED ETHERNET LOCAL AREA NETWORKS (LANS)

BACKGROUND OF THE INVENTION

1. Field of the Invention

The present invention relates in general to the Ethernet Backplane area and, in particular, to an Ethernet switch that has Carrier Class resilience and redundancy characteristics when it interfaces with chassis based application blades (e.g., switches and end stations).

2. Description of Related Art

Ethernet is commonly seen as the most cost efficient networking technology in the Local Area Network (LAN) area. During the past decade, Ethernet has also been increasingly adopted as the technology of choice for other networking applications, such as Wide Area Networks and Public Access Networks. To support these other types of applications, the Ethernet standards framework has been updated and expanded in several ways to achieve the adequate properties and characteristics for each type of usage.

For instance, Ethernet has recently been brought into the local networking domain known as Backplanes, to form the connectivity infrastructure for equipment shelves (a.k.a. sub-racks) that house computing and switching devices. In view of market demands for a unified manner of using this connectivity infrastructure, the Ethernet standardization forum IEEE 802.3 has embarked on a standards effort in this area, with a task force known as "Ethernet in the Backplane". The outcome of this effort is expected to be useful for several networking business segments, including the telecommunications sector.

It is notable that this task force is working with a clearly defined scope, which focuses on the physical and electrical aspects of the Backplane. Excluded from the scope are several other aspects that also need to be addressed in order to implement this local connectivity. These aspects include redundancy and resiliency mechanisms which enable one to accomplish "Carrier Class" levels of high availability. It is also notable that the current Ethernet standards framework is associated with building networks that have redundant paths between nodes, but that the fail-over performance of the currently standardized mechanisms fail to accomplish "Carrier Class" levels of high availability.

The present invention is related to the Ethernet Backplane area and has a particular focus on a method for providing Carrier Class resilient (redundant, self-healing) Ethernet connectivity in such an environment. With regard to existing technology and relevant prior art, there are several different types of resiliency solutions some of which are described next.

Standards Compliant Solutions

Traditional resiliency solutions that make use of standard compliant Ethernet LAN devices can be built with a fairly high degree of freedom in terms of network topology even though the Ethernet Standards framework requires a loop-free active topology. This freedom is possible due to the standardized mechanisms for topology discovery and automatic configuration.

These solutions can be built with redundancy on the link and equipment levels, using parallel links and duplicated switches to provide a certain amount of robustness. The parallel links can use IEEE Std 802.3 Link Aggregation, with one or more links manually configured as backup links. When the physical topology includes duplicated switches and redundant crosslinks, IEEE Std 802.1D/Q Spanning Tree Protocols automatically place the relevant links in standby mode to ensure that the active logical topology is loop-free.

In theory, a system based on the above referenced standardized mechanisms could support a deterministic fail-over behavior, but this is not enough. Because, in all of these mechanisms, the time scale for fail-over performance is in the order of seconds, at best. The length of this time scale is such because of the protocols and timers involved in the detection of link failures and the subsequent re-discovery of the active topology. As a result, the time scale for this fail-over performance is 2 to 3 orders of magnitude inferior to that required for Carrier Class performance which is typically 50 ms to 100 ms.

Modified Standards Based Solutions

U.S. Pat. Nos. 6,910,149 and 7,173,934 describe different methods and arrangements for using Ethernet switches with a standards based but modified behavior (i.e. deviating from the standards) to provide resilient connectivity in a LAN. The contents of these patents are incorporated by reference herein.

Both patent applications describe solutions for making a pair of Ethernet switches appear as one resilient Ethernet switch to other devices (switches and end stations) that are attached to the LAN. This is done first by having the pair of Ethernet switches implement a proprietary mechanism that makes the two distinct Ethernet switches appear as one resilient switch. And, then by having each device (switch and end station) use "Link Aggregation" as per IEEE Std 802.3. These methods and arrangements are typically used in general LAN applications.

Even though these solutions and other solutions which are used in currently available Ethernet switching products substantially improve the fail-over characteristics when compared to the standard based solutions, these improvements are in general insufficient: Since these (modified standards based solutions) base their fail-over primarily or solely on failure detection in the physical layer, the fail-over times are largely PHY dependent. This results in a fail-over performance which is around one order of magnitude inferior to that required for Carrier Class performance.

Proprietary Solutions for Specific Use

In the context of Ethernet networking, there are also numerous proprietary solutions for providing redundancy in chassis based nodes, e.g. switches and routers. These solutions are often based on proprietary protocols which are associated with a backplane that is located between a duplicated switch matrix and a duplicated interface board. These protocols and mechanisms which are used on the backplane are strictly internal and hidden from the devices (e.g. switches and end stations) that are connected to the external interfaces of the chassis based node. As such, these solutions are typically designed and optimized for a specific backplane architecture and have strict constraints on internal network topology and size.

Other Solutions for Adjacent Usage Areas

Another though not entirely relevant type of solution is worth mentioning, since its objectives are somewhat similar. This solution is based on a closed loop configuration (Ethernet switching rings), which can be built for example in a LAN or MAN when all of the switches therein implement a particular protocol for topology control. In one implementation of this solution which has been made public in IETF RFC 3619 "Ethernet Automatic Protections Switching" (EAPS), at least one link in the ring is held in hot standby mode, until a node or link failure is detected somewhere in the ring. However, in this type of solution it is common that the traffic disruption time is highly dependent on L1 (PHY) failure detection time. And as described above, fail-over times that are largely PHY dependent result in a fail-over performance that is around one order of magnitude inferior to that required for Carrier Class performance.

BRIEF SUMMARY OF THE INVENTION

One object of the present invention is to provide an Ethernet switch that has Carrier Class resilience and redundancy characteristics when it interfaces with chassis based application blades (e.g. switches and end stations). In the preferred embodiment, the Ethernet switch has a resilient switch control system (RSCS), which manages redundant switch matrixes that use redundant links to connect to one or more application blades (e.g., switches, end stations). The Ethernet switch has Carrier Class characteristics because a Rapid Link Supervision Protocol (RLSP) is used to detect a fault in any one of the redundant links between the redundant switch matrixes and the application blades. And, a RLSP distribution policy is used to coordinate and control isolation measures between the redundant switch matrixes and the application blades. Another object of the present invention is to provide a method for enabling resilient Ethernet connectivity in a network. These objects and other objects are satisfied by the present invention as set forth below.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
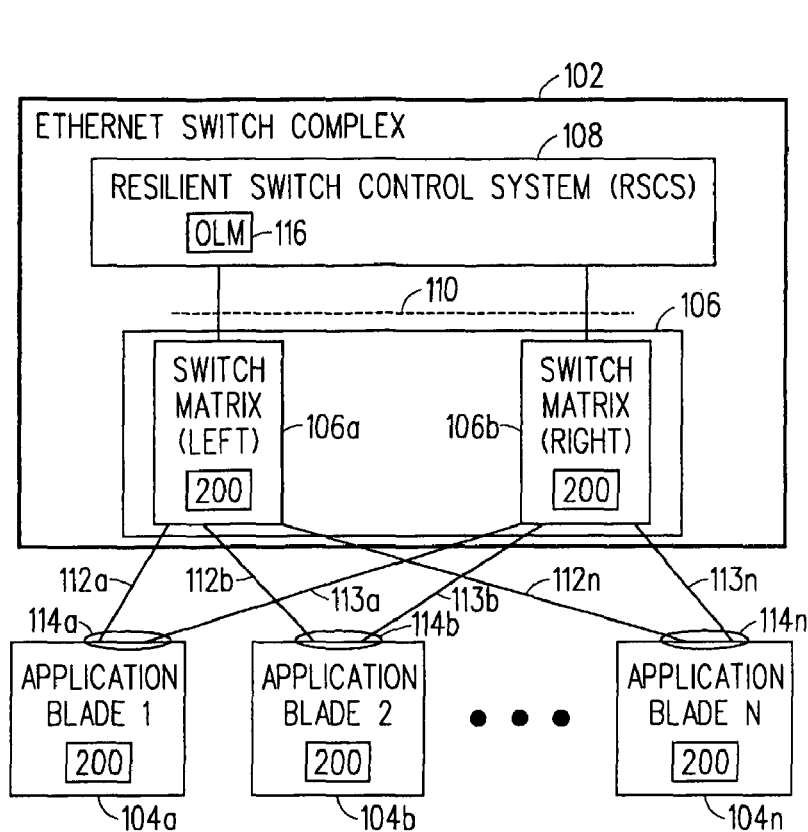
FIG. 1 is a block diagram of a network which includes an Ethernet switch and multiple application blades all of which have Carrier Class characteristics in accordance with the present invention.

Referring to FIG. 1, there is a block diagram of a resilient network 100 which includes an Ethernet switch complex 102 that is connected to multiple application blades 104a, 104b ... 104n. As shown, the Ethernet switch 102 has a redundant (duplicated) switch matrix 106 which includes a left switch matrix 106a and a right switch matrix 106b. The Ethernet switch 102 also includes a Resilient Switch Control System (RSCS) 108 which uses switch internal management interfaces 110 to connect to the left switch matrix 106a and the right switch matrix 106b. It should be appreciated that the left switch matrix 106a and the right switch matrix 106b may or may not be interconnected to one another with links which can be used for a variety of purposes like forwarding a payload. These links are not shown in FIG. 1.

In the preferred embodiment, the application blades 104a, 104b ... 104n are switches or end stations that sit in an equipment shelf (a.k.a. subrack). Each application blade 104a, 104b ... 104n connects to the Ethernet switch 102 using two "link groups" 112a and 113a, 112b and 113b ... 112n and 113n, respectively. Each of these link groups may consist of one or more individual Ethernet links, with the restriction that link group pairs 112a and 113a (for example) that connects to the same application blade 104a (for example) are symmetrical with respect to link types and number of links. Consequently, each application blade 104a, 104b ... 104n connects to the Ethernet switch 102 using an even number of individual Ethernet links that are configured as Link Aggregated links in accordance with IEEE Std. 802.3, clause 43.

The contents of this standard are incorporated by reference herein. As shown, the application blades 104a, 104b ... 104n use link groups 112a, 112b ... 112n, respectively, to connect to the left switch matrix 106a. And, the application blades 104a, 104b ... 104n use link groups 113a, 113b ... 113n, respectively, to connect to the right switch matrix 106b. In this way, all of the application blades 104a, 104b ... 104n are symmetrically connected to both switch matrixes 106a and 106b and hence, network redundancy is achieved throughout the switched LAN 100.

As indicated above, each application blade 104a, 104b ... 104n is bound to the Link Aggregation standard and as a result each blade can distribute frames to one or more working links of link group pairs 112a/113a, 112b/113b ... 112n/113n within a corresponding Link Aggregation Group (LAG) 114a, 114b ... 114n. There is no specific distribution policy prescribed by the Link Aggregation standard, but in case a fault is detected for any link within link groups 112a and 113a (for example) within a LAG 114a (for example) (i.e. the PHY provided status indication link_status=DOWN), the frames destined for the broken link are distributed onto one or more of the remaining links of link groups 112a and 113a within the LAG 114a. Hence, in the event switch matrix 106a (for example) fails, the attached application blades 104a, 104b ... 104n which detect the fault, "automatically" modify their frame distribution policy to only use links of 113a, 113b ... 113n (for example) that are attached to the remaining switch matrix 106b (for example). However, as described in detail above it is not desirable to use a distribution policy based on PHY provided status indications because it is too slow to achieve Carrier Class performance. This problem is addressed by the present invention.

The switch matrixes 106a and 106b can be implemented to be individually removable, without disturbing the integrity of the other matrix. Thus, in conjunction with the aforementioned Link Aggregation characteristics on the application blades 104a, 104b ... 104n, the switched LAN 100 is capable of preserving connectivity, even if one of the switch matrixes 106a or 106b is faulty, powered off, or even manually removed. This provides for robust handling in case of faults and also provides for planned activities such as equipment repair, hardware and software upgrades.

In addition, the switch matrixes 106a and 106b can be scalable with regards to the bandwidth and number of available ports. And, both switch matrixes 106a and 106b shall be fully symmetrical, port-by-port, for all external Ethernet ports. However, the only stable state asymmetry allowed and foreseen in this configuration of the LAN Network 100 is one where one of the switch matrixes 106a or 106b is completely isolated, either by a fault or by management intervention.

The RSCS 108 controls the switch matrix 106 by managing each individual switch matrix 106a and 106b to ensure that the two switch matrixes 106a and 106b operate as a single Ethernet Bridge, according to IEEE Std. 802.3 and IEEE Std. 802.1D/Q. The contents of these standards are incorporated by reference herein. To accomplish this, the RSCS 108 can use processing elements that are physically centralized or distributed, or a mixture thereof. The RSCS 108 may also use resilience schemes such as multi-PRO, 1+1, 1+N etc. . . .

As described in detail below, the present invention enables this configuration of the Ethernet network 100 to meet Carrier Class requirements. One of the requirements to meet Carrier Class performance is that traffic disturbances to end user sessions need to be avoided regardless of the types and numbers of end user sessions active at the time of fail-over. Apart from the pure data transfer applications originally targeted by Ethernet LAN systems, these end user sessions can be involved with voice and streaming media, etc., implying a required fail-over time scale in the order of tens of milliseconds (ms). For systems that claim Carrier Class conformance, a typical value of the fail-over time scale is 50 ms, and a common maximum value is 100 ms. As described in the Background Section, this time scale is too tight for all known existing standards based solutions.

Following is a list of requirements that are addressed by the present invention which make it possible to achieve a Carrier Class resilient Ethernet network 100:

Rapid detection of faults and isolation states of LAN segments 112a, 112b . . . 112n and 113a, 113b . . . 113n.

Rapid fail-over in case of faults and controlled isolation.

Deterministic fail-over behavior (a given cause—one result).

Manage coordinated isolation of each switch matrix 106a and 106b.

RLSP

The first requirement in this list that needs to be addressed in order to achieve Carrier Class performance can be satisfied by using a Rapid Link Supervision Protocol (RLSP). RLSP is used on the individual links of 112a, 112b . . . 112n and 113a, 113b . . . 113n, i.e. on the individual links included in a LAG 114a, 114b . . . 114n. The basic operating principle of RLSP is that two devices 104a and 106a (for example), which are interconnected by one or more links 112a, need to exchange protocol specific Protocol Data Units (PDUs) to verify the status of those link(s) 112a or the remote device 104a and 106a. This same principle is then applied to all links involved in the scheme, i.e. also to the link(s) 113a that interconnect device 104a (for example) with device 106b.

Figure 2:
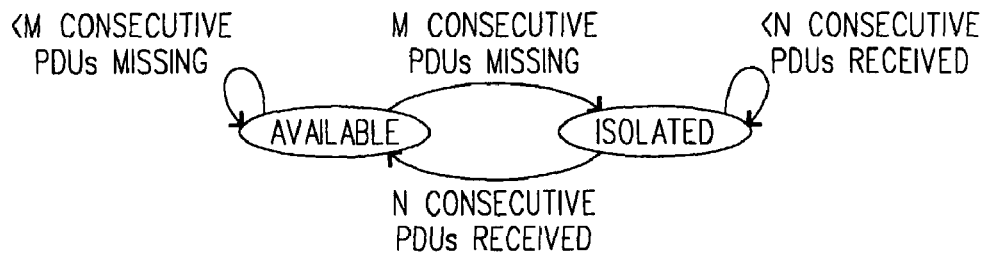
FIG. 2 is a diagram that illustrates a two-state state machine which can be implemented in the Ethernet switch and application blades shown in FIG. 1.

To exchange these PDUs, RLSP compliant devices 104a, 104b . . . 104n, 106a and 106b are required to respond to any received RLSP PDUs, by transmitting matching RLSP response PDUs on the same individual link that each individual RLSP PDU was received from. This response procedure does not need to pay any attention to the interval with which RLSP PDUs are received, but needs to simply respond, as soon as possible, with an RLSP response PDU. However, the reception of RLSP PDUs and RSLP response PDUs, respectively, are the events that drive the RLSP state machine 200, as illustrated in FIG. 2, and further described in the following.

As such, to supervise a link within link group 112a (for example), at least one device 106a (for example) of the two attached devices 104a and 106a (for example) must generate RLSP PDUs. An RLSP compliant device that is actively generating RLSP PDUs can be referred to as an 'active RLSP device', while an RLSP compliant device that does only respond to RLSP PDUs is referred to as a 'passive RLSP device'. In a case where a device 106a (for example) is active and a device 104a is passive, the passive RLSP device 104a needs to implement logic to supervise the interval of the received RLSP PDUs, in addition to implementing the mandatory response logic, in order to detect protocol state changes in the status of the individual link(s) of 112a or the remote device 106a. And, the active RLSP device 106a needs to send RLSP PDUs and await the receipt of the RLSP response PDUs from the passive RLSP device 104a to detect protocol state changes in the status of the individual link(s) of 112a or the remote device 104a. In this case, where only one device 106a (for example) of the two devices 104a and 106a (for example) is actively generating RLSP PDUs, the active device 106a is the only one able to supervise both directions of the individual link(s) of 112a. The passive device 104a may only supervise its receive direction of the individual link(s) of 112a, by supervising the interval of the RLSP PDU receptions.

Alternatively, it is possible to supervise the link(s) of 112a (for example), by having two active RLSP devices 104a and 106a (for example) each supervising both directions of the link(s) of 112a. In this case, if response PDUs are not returned on either one or both directions of a link of 112a then the link is faulty. Each active device 104a and 106a may supervise the link(s) of 112a using different intervals.

In the preferred embodiment, the RLSP PDUs and the RLSP response PDUs are both implemented as layer 2 Ethernet Protocol Data Units. And, both RLSP PDUs and RLSP response PDUs use a dedicated multicast MAC address in a Destination Address field, as an identifier. This arrangement supports a simple, standard-like means that can be used by the RLSP device's MAC entities to identify and filter out the RLSP PDUs and RLSP response PDUs from the other flows on the links of 112a, 112b . . . 112n and 113a, 113b . . . 113n. For instance, NIC/MAC devices, switch chips etc. are with few exceptions capable of separating these multicast frames from other frame flows and directly distributing them to a processing unit, via a management interface. The processing unit may be a central processing unit (CPU) or any other device, running RLSP and its associated supervision, either in hardware or software.

As can be seen, the RLSP and its associated PDU supervision is used by the present invention to determine the present state of one or more links 112a, 112b . . . 112n and 113a, 113b . . . 113n between the RLSP compliant devices 104a, 104b . . . 104n, 106a and 106b. To help with this supervision of RLSP PDUs and RLSP response PDUs, a two-state state machine 200 can be used which is defined as shown in FIG. 2. In the preferred embodiment, each RLSP compliant device 104a, 104b . . . 104n, 106a and 106b implements one state machine 200 for each individual link of 112a, 112b . . . 112n and 113a, 113b . . . 113n connected thereto. In operation, the instance(s) of state machine 200 which is implemented in device 106a (for example) that happens to be actively generating RLSP PDUs on the link(s) of 112a (for example) is driven by the reception of RLSP response PDUs from the remote device 104a (for example). And, the instance(s) of state machine 200 which is implemented in a passive device 104a (for example) is driven by the reception of RLSP PDUs on the link(s) of 112a (for example) sent from the active device 106a (for example).

The state machine 200 shown in FIG. 2 is also designed with built-in hysteresis to cater for improved state robustness in case of occasional frame faults, equipment related clock skew, or other potential short term disturbances that may be noticeable across the supervised links of 112a, 112b . . . 112n and 113a, 113b . . . 113n. The constants N and M shown in the state machine 200 are tunable integers. For instance, a reasonable default setting for these constants may be N=M=3.

To achieve robust and deterministic behavior of the RLSP supervision, it is recommended that the RLSP PDUs and RLSP response PDUs are treated with "high enough" priority, whenever injected onto a link. For most implementations, the RLSP PDUs and RLSP response PDUs can be granted the highest priority so that they can virtually bypass any queuing or buffering, or non-favorable scheduling related treatment. As will be explained later, it is possible to achieve Carrier Class resilience based on RLSP that does not consume more than approximately 0.01% of the bandwidth of a GE link (1 Gbit/s Ethernet link).

As will also be explained in detail in the following sections, the RLSP state machines 200 should be monitored by some overall LAN Management (OLM) function 116. To speed-up this time critical monitoring, all RLSP devices 104a, 104b . . . 104n, 106a and 106b can be implemented to spontaneously report any state change to the OLM function 116 which is shown in FIG. 1 as being located in the RSCS 108.

The RLSP Distribution Policy

As dictated by the Link Aggregation standard, an aggregator (e.g., RLSP compliant device) of a LAG 114a (for example) that includes a set of individual links can distribute frames onto those links according to a set of rules, referred to as a distribution policy. This distribution policy may be freely chosen, as long as it does not result in frame re-ordering within each separate flow. In addition, the Link Aggregation standard specifies that if a link of 112a (for example) included in a multi-link LAG 114a (for example) would fail, the flows originally destined to the failed link of 112a need to be re-distributed across the remaining link(s) of 112a (if applicable) and 113a of that LAG 114a. As mentioned above, the traditional mechanism that determines the status of the links, is the standard PHY status indication link_status. However, for some PHYs, this indication is simply too slow (seconds). Hence, in order to achieve a deterministic fail-over mechanism with Carrier Class performance, the present invention makes use of RLSP states from the state machine 200 to control a distribution policy.

The RLSP distribution policy of the present invention acts on the RLSP states for each link of 112a, 112b . . . 112n and 113a, 113b . . . 113n included in a LAG 114a, 114b . . . 114n, respectively. For instance, the RLSP distribution policy can have a load-balancing function that acts on the RLSP states in the state machines 200 to properly distribute frames between the links in the LAGs 114a, 114b . . . 114n that are in an Available state. On the other hand, the RLSP distribution policy with this load-balancing function can prevent frames except for a sub set of MAC protocol/control frames (e.g., Link Aggregation Control Protocol (LACP) and RLSP related PDUs) from being distributed to the links in LAGS 114a, 114b . . . 114n that are in an Isolated state.

The RLSP distribution policy can also be adapted to handle RLSP state changes without additional delay. And, the supported hysteresis mechanism of the RLSP state machine 200 can be used to provide protection against spurious transitions between the states that would otherwise result in unstable behavior. It should be noted that restrictions of the aforementioned standard Link Aggregation policy would still apply to the RLSP distribution policy.

Isolation Control—Overall LAN Management

As described above, by using the concepts of RLSP it is possible to achieve Carrier Class resilience characteristics in an Ethernet network 100 that is structured as illustrated in FIG. 1. It should also be understood that by making use of some specific configuration settings, it is possible for the Ethernet switch 102 to control and manage single-point fault situations, as well as provide full support for disturbance free isolation of redundant switch matrixes 106a and 106b. This functionality is necessary to be able to implement various repair and upgrade operations.

Furthermore, by configuring only the switch matrixes 106a and 106b to actively generate RLSP PDUs, the switch matrixes 106a and 106b can partly control the RLSP state machines 200 in the application blades 104a, 104b . . . 104n. For example, if switch matrix 106a avoids generating RLSP PDUs on a certain link of 112a, the RLSP state machine 200 at the end of that link which is attached to the application blade 104a would then change to the Isolated state. As a consequence, the application blade 104a would inhibit the distribution of any payload traffic to that link of 112a, until the switch matrix 106a re-starts the RLSP PDU generation on that link and the corresponding RLSP state machine 200 in the application blade 104a is switched back to the Available state.

Following the same logic, should a real fault in a link of 112a (for example) inhibit the RLSP PDUs to reach an application blade 104a (for example), or if the generation logic at the switch matrix 106a (for example) would fail, then the relevant RLSP state machine 200 in the application blade 104a would detect the fault and prevent distributing frames "into the void". As such, there is a mechanism where individual application blades 104a (for example) can determine by themselves towards what switch matrix 106a or 106b to transport its frames. The faults of the switch matrix 106a (for example) and/or all the links of 112a, 112b . . . 112n (for example) are detected in the same way as if a switch matrix 106a (for example), deliberately or not, stops generating RLSP PDUs.

Moreover, if a switch matrix 106a (for example) simultaneously stops sending RLSP PDUs on all its links of 112a, 112b . . . 112n, then all attached application blades 104a, 104b . . . 104n revert to distributing frames only on links of 113a, 113b . . . 113n towards the other Available switch matrix 106b. In analogy with the RLSP state machine 200, the Ethernet switch 102 can in this case be modeled as having one Available switch matrix 106b and one Isolated switch matrix 106a.

To control these distributed isolation mechanisms, an Overall LAN Management (OLM) function 116 can be used to coordinate operations on the switch matrixes 106a and 106b. In particular, the OLM function 116 can trigger the isolation and/or de-isolation of the switch matrixes 106a and 106b based on events like operator interaction (e.g. isolation ordered as a preparation for hardware replacement) or detection of faults in the LAN 100. The OLM function 116 is shown in FIG. 1 as being implemented as a part of the RSCS 108, although other alternative solutions are feasible too.

As described above, the switch matrixes 106a and 106b can continuously supervise all internal segments of the LAN 100 with a fault detection time that matches that of the RLSP. Hence, any transition in any RLSP state machine 200 as well as any switch internal fault that is reported to the OLM function 116 can be used to resolve the status of the switched LAN 100. The complexity of this task can be more or less significant, depending largely on the internal structure of the Ethernet switch 102, since the OLM function 116 needs to be aware of the overall topology of the LAN system 100.

Now, if the OLM function 116 is made aware of a fault somewhere in the LAN 100, then a quick process is started to resolve the probable cause of the fault. The OLM function 116 can even conclude that one of the switch matrixes 106a or 106b needs to be isolated. If this is the case, the OLM function 116 then orders the device(s) making up that switch matrix 106a (for example) to isolate itself by means of RLSP, and as already described, the switch matrix 106a soon becomes Isolated.

For different reasons, it may be desirable not to turn off RLSP completely in a RLSP compliant device 104a, 104b . . . 104n, 106a and 106b even in the event of an isolation, as some basic supervision capability is lost with the lack of RLSP PDU interaction. To ensure the RLSP is not completely turned off in a device 104a, 104b . . . 104n, 106a and 106b, a somewhat refined solution needs to be implemented which can still support all of the features described above. One solution is to have the isolated switch matrix 106a (for example) lower the intensity of the RLSP PDU generation by some factor of 10 or more. In this case, the application blades 104a, 104b . . . 104n are still required to respond to the PDUs, but their state machines 200 associated with their links of 112a, 112b . . . 112n, respectively, (for example) are firmly "locked" in the Isolated state. Then the isolated switch matrix 106a can verify the RLSP response PDUs against the applied "low" interval and hence, the status of the links of 112a, 112b . . . 112n can still be monitored even with a slower RLSP status change detection.

Resilience Performance

The approximate RLSP fault detection time in an RLSP compliant device 104a, 104b . . . 104n, 106a and 106b can be expressed as:

$$T_{PDU} * M \leq t_{RLSP} \leq T_{PDU} * (M+1)$$

where $t_{RLSP}$ is the fault detection time, $T_{PDU}$ is the RLSP PDU generation period and M is the state machine variable M, as shown in FIG. 2.

Assuming a case where a fault is initially detected by a subset of the application blades 104a, 104b . . . 104n, the OLM function 116 receives the status change indications from the application blades 104a, 104b . . . 104n detecting the fault and initiates a fault analysis process. After a processing time of $t_{Proc}$ ms, the OLM function 116 has resolved the situation and orders one of the switch matrixes 106a (for example) to be isolated, which triggers the remaining application blades 104a, 104b . . . 104n to fail-over to the non-isolated switch matrix 106b (for example). The time to execute this complete scheme can be expressed as:

$$T_{Total} \leq 2T_{PDU} * (M+1) + t_{Proc}.$$

As an example, assume a budget where isolation is required within 100 ms from the moment a fault is introduced, an RLSP period of 10 ms with M=3 leaves 20 ms for fault analysis and management of the isolation by the OLM function 116.

It should be noted that it is also feasible to support application blades 104a, 104b . . . 104n or groups of application blades with different requirements for isolation and fail-over performance in the same LAN system 100. This differentiated performance can be achieved by having the switch matrixes 106a and 106b generate RLSP PDUs with a rate that matches each individual or group of application blades 104a, 104b . . . 104n.

As briefly mentioned above, the RLSP PDUs and RLSP response PDUs have a bandwidth consumption that is proportional to the intensity of generation and size of the PDUs. As an example, assume that each of the PDUs are 128 bytes in size and have a period of 10 ms. This configuration would result in a bandwidth consumption of [(inter frame gap+preamble+PDU length)*(8 bits per byte)*(number of PDUs per second)]=[(12+8+128)*8*100)]=118400 bits/s, for each actively generating RLSP device 106a (for example). And, this bandwidth consumption is 1.2% of a 10 Mbit/s Ethernet link, 0.12% of an FE link, 0.012% of a GE and 0.0012% of a 10GE link.

Figure 3:
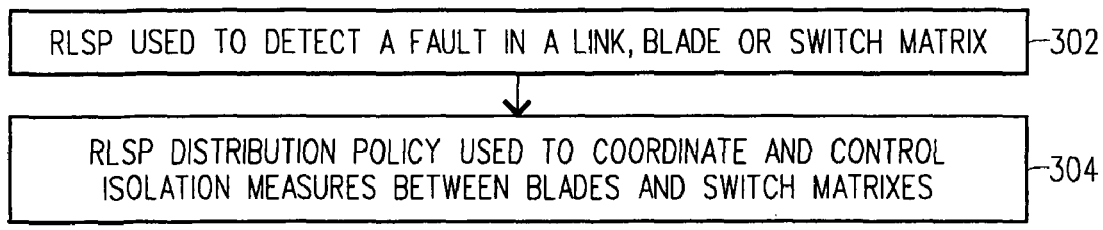
FIG. 3 is a flowchart that indicates the steps of a preferred method for providing resilient Ethernet connectivity in the network shown in FIG. 1.

From the foregoing, it can be readily appreciated by those skilled in the art that the present invention includes a method 300 for providing resilient Ethernet connectivity in a network 100 like the one shown in FIG. 1. The basic steps of method 300 are shown in FIG. 3. Beginning at step 302, the RLSP is used to detect a fault in anyone of the redundant links of 112a, 112b . . . 112n and 113a, 113b . . . 113n between the application blades 104a, 104b . . . 104n and the switch matrixes 106a and 106b. Then at step 304, the RLSP distribution policy is used to coordinate and control isolation measures between the application blades 104a, 104b . . . 104n and the switch matrixes 106a and 106b. The details about how all of this can be accomplished have already been described.

Following are some features, advantages and uses of the present invention:
  One advantage of the present invention is that it supports rapid fail-over times in line with Carrier Class requirements, in a configurable and PHY independent manner. This is because, RLSP can be configured to operate on almost any time scale and, as such, it can be operated independent of the Layer 1 (PHY) technology used.
  The present invention can be easily implemented in a wide variety of application blades like switches and end stations by using RLSP and its state machine 200.
  Another advantage of the present invention emanates from the fact that it is backwards compatible with current standards compliant systems (although these could not provide Carrier Class performance), and it takes into consideration future standardization of the particular mechanisms introduced by this invention.
  Although the present invention has been described as being used in local networking over high speed backplane interconnects, there is nothing in the present invention that prohibits its usage in other networking contexts as well.
  It should be appreciated that the redundant entities used in the present invention can be exact mirror images of each other, which has the following advantages:
    Renders a simple and deterministic fail-over behavior because redundant entities in mated pairs implicitly know the basic configuration of each other.
    Facilitates configuration, backup and maintenance because there can be one master configuration file in a fault tolerant central storage unit and/or distributed storage unit.
    Gives a straightforward scheme for isolation during maintenance operations.
  The Ethernet switch 102 of the present invention can use more than one LAG per application blade and each LAG may include 2, 4, 6, 8 . . . links. And, in the present invention, each of the links are individually supervised by means of RLSP and all multi-link LAGs are subject to the RLSP distribution policy.
  It should be appreciated that many components and details associated with the resilient network 100 described above are well known in the industry. Therefore, for clarity, the description provided above omitted those well known components and details that are not necessary to understand the present invention.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A switched Local Area Network (LAN) structure, comprising:

a plurality of active LAN switches that generate and transmit Protocol Data Units (PDUs);

a plurality of passive end stations that only transmit response PDUs in response to receiving PDUs from the active LAN switches; and a plurality of Ethernet links connecting the active LAN switches and the passive end stations;

wherein each of the active LAN switches and the passive end stations include:

a plurality of ports for transmitting and receiving PDUs on the plurality of Ethernet links;

a plurality of state machines, each state machine associated with a different one of the plurality of ports, wherein each state machine controls whether the state machine's associated port is in an isolated state or an available state based solely on measurements of PDUs received at the associated port; and means for isolating or making each port available based on control inputs from each port's associated state machine; and wherein each of the active LAN switches includes means for controlling for each of its ports, whether or not a particular end station connected at the far end of a corresponding Ethernet link, is allowed to transmit traffic flows towards the active LAN switch through the corresponding Ethernet link, by modifying an interval with which the active LAN switch generates and transmits PDUs toward the particular end station.

2. A method of controlling traffic flow paths between a plurality of active Local Area Network (LAN) switches and a plurality of passive end stations in a switched LAN structure in which the LAN switches and end stations are connected by a plurality of Ethernet links, said method comprising the steps of:

implementing a state machine for each port within each LAN switch and end station, wherein each state machine controls whether the state machine's associated port is in an isolated state or an available state based solely on measurements of Protocol Data Units (PDUs) received at the associated port; and controlling traffic flow paths by each active LAN switch by modifying an interval with which the active LAN switch generates and transmits PDUs toward particular end stations;

wherein upon measuring the interval with which PDUs are received at a given port in a particular end station, the associated state machine for the given port controls the end station's ability to generate traffic flows toward the given port.

3. The method according to claim 2, further comprising the steps of:

detecting a fault within the switched LAN structure; and modifying by certain active LAN switches forwarding traffic flows that are affected by the fault, the interval with which the certain active LAN switches generate and transmit PDUs toward particular end stations in order to isolate the fault while minimizing traffic loss.

4. The method according to claim 3, further comprising the steps of:

detecting that the fault has been corrected; and modifying by the certain active LAN switches forwarding traffic flows that are affected by the fault, the interval with which the certain active LAN switches generate and transmit PDUs toward particular end stations in order to return to normal traffic flow with zero traffic loss.

5. The method according to claim 2, further comprising the steps of:

receiving an indication that an identified LAN switch will be taken down for LAN switch maintenance; and modifying by certain active LAN switches forwarding traffic flows that are affected by the downed LAN switch, the interval with which the certain active LAN switches generate and transmit PDUs toward particular end stations in order to isolate the downed LAN switch with zero traffic loss.

6. The method according to claim 5, further comprising the steps of:

receiving an indication that the identified LAN switch has been returned to service; and modifying by the certain active LAN switches forwarding traffic flows that are affected by the downed LAN switch, the interval with which the certain active LAN switches generate and transmit PDUs toward particular end stations in order to return to normal traffic flow with zero traffic loss.

7. An active Local Area Network (LAN) switch for controlling traffic flow paths between the active LAN switch and a plurality of passive end stations in a switched LAN structure in which the LAN switch and the passive end stations are connected by a plurality of Ethernet links, wherein each passive end station includes a plurality of ports, each port being controlled by an associated state machine, wherein each state machine controls whether the state machine's associated port is in an isolated state or an available state based solely on measurements of Protocol Data Units (PDUs) received at the associated port, the active LAN switch comprising:

a plurality of ports for communicating with the plurality of passive end stations; and means for controlling traffic flow paths between the active LAN switch and each passive end station by modifying an interval with which the active LAN switch generates and transmits PDUs toward each end station;

wherein upon measuring the interval with which PDUs are received at a given port in a particular end station, the associated state machine for the given port controls the end station's ability to generate traffic flows toward the given port.

* * * * *